(12) United States Patent
Kipp et al.

(10) Patent No.: US 9,390,093 B1
(45) Date of Patent: Jul. 12, 2016

(54) MANAGING DATA OBJECTS (75) Inventors: David M. Kipp, Hudson, OH (US);
Douglas A. Wood, Westford, MA (US);
John M. Hayden, Holliston, MA (US);
Stephen J. Todd, Shrewsbury, MA (US)

(73) Assignee: EMC Corporation, Hopkinton, MA (US)

(*) Notice: Subject to any disclaimer, the term of this patent is extended or adjusted under 35 U.S.C. 154(b) by 0 days.

(21) Appl. No.: 13/075,502

(22) Filed: Mar. 30, 2011

(51) Int. Cl.
*G06F 17/30* (2006.01)

(52) U.S. Cl.
CPC ............... *G06F 17/30058* (2013.01)

(58) Field of Classification Search
USPC .......... 707/608, 640, 687, 705, 790, 791, 813
See application file for complete search history.

(56) References Cited

U.S. PATENT DOCUMENTS

| | | | | |
|---|---|---|---|---|
| 2006/0123079 A1* | 6/2006 | Sturniolo | ............ | H04W 80/045 709/203 |
| 2009/0106571 A1* | 4/2009 | Low | ...................... | G06F 9/4856 713/310 |
| 2010/0099393 A1* | 4/2010 | Brisebois et al. | ............. | 455/418 |
| 2010/0099405 A1* | 4/2010 | Brisebois et al. | ............. | 455/434 |

OTHER PUBLICATIONS

U.S. Appl. No. 12/494,622, filed Jun. 30, 2009, Dean D. Throop, et al.

* cited by examiner

*Primary Examiner* — Sana Al Hashemi
(74) *Attorney, Agent, or Firm* — John T. Hurley; Jason A. Reyes; Krishnendu Gupta (57) ABSTRACT

A method and system for use in managing data objects is disclosed. In at least one embodiment, the method and system comprises based on at least one policy set, determining that a data object stored on a first device is eligible for mobile enablement and a level of mobile enablement for the data object; mobile enabling the data object, wherein mobile enabling the data object comprises causing a mobile data storage tier associated with the first device to include the data object; and providing access to the data object to a second device, wherein access is defined by the level of mobile enablement.

20 Claims, 6 Drawing Sheets

MANAGING DATA OBJECTS

TECHNICAL FIELD

The present invention relates to managing data objects.

BACKGROUND

As the mobility of computer users continues to expand, the need for each user to access local data (e.g., files, music, photos, email, calendars, applications located on a local machine that is part of a private and protected network) while at remote locations increases. Also, a user may want to be able to access the data from a remote location using one or more of a number of remote devices owned by the user (e.g., a home computer, a work computer, a laptop, a netbook, a PDA, a cell phone).

Conventionally, a user who desires to access local data from a remote location first needs to transport a copy of the data onto a remote device by either directly copying the data onto the device or using an intermediary storage device that can be used to copy the data from its local location to the remote device (e.g., a USB flash drive). The user can then access the copy of the data on the remote device.

Another conventional approach allows a user to place the data on a remote storage device that is accessible via a network connection, such as a computer or server that is remotely accessible via a telephone or internet connection. The computer can be, for example, the user's home or office computer that is configured for remote access. When the user requires local data from a remote location, the user first connects to the home or office computer via a telephone or internet connection and then downloads the file to the portable device. For added security, remote access to the user's home or office computer over a shared public data network can be achieved using a conventional Virtual Private Network (VPN).

Yet another conventional approach uses a web-based file hosting service that enables users to store and share files and folders over the internet. Generally, a user selects data to upload to the web-based service, which may be responsible for syncing the uploaded data with other devices belonging and selected by the user.

SUMMARY OF THE INVENTION

A method and system for use in managing data objects is disclosed. In at least one embodiment, the method and system comprises based on at least one policy set, determining that a data object stored on a first device is eligible for mobile enablement and a level of mobile enablement for the data object; mobile enabling the data object, wherein mobile enabling the data object comprises causing a mobile data storage tier associated with the first device to include the data object; and providing access to the data object to a second device, wherein access is defined by the level of mobile enablement.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

Described below is a technique for use in managing data objects. In accordance with an embodiment of the technique, mobile enablement can be provided to help ensure the high availability of data objects while maintaining data integrity, privacy, and security.

Figure 1:
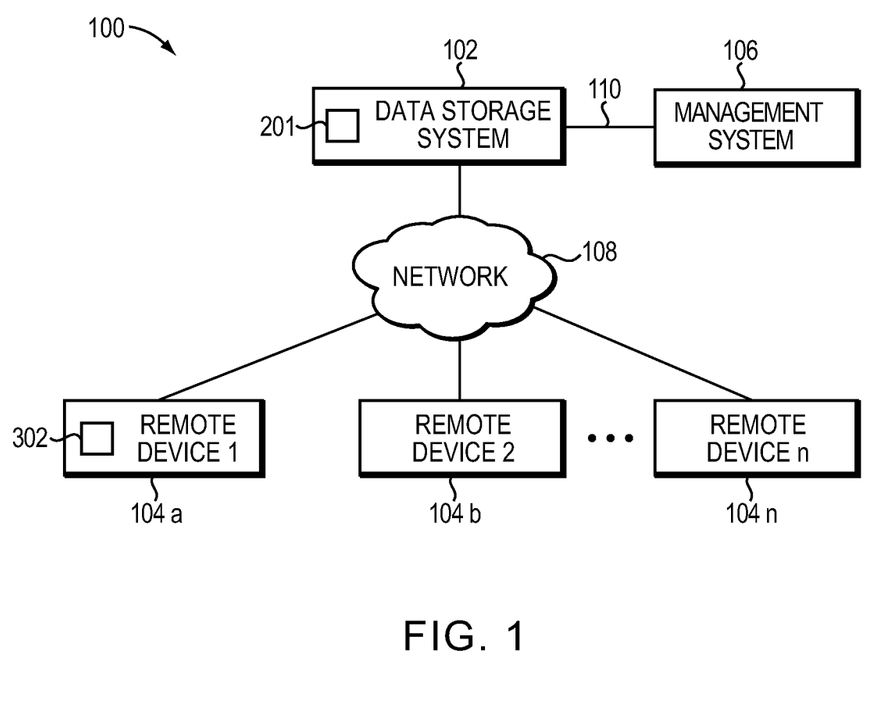
FIG. 1 illustrates an example system that may be used with an embodiment of the technique herein.

Referring to FIG. 1, shown is an example of an embodiment of a system that may be used in connection with performing the technique described herein. The system 100 includes one or more data storage systems 102 connected to remote devices 104a-104n through network 108. The system 100 also includes a management system 106 connected to one or more data storage systems 102 through communication medium 110. In this embodiment of the system 100, the management system 106, and servers or hosts (not shown) may access the data storage systems 102, for example, in performing I/O operations, data requests, and other operations. Network 108 may be any one or more of a variety of networks or other type of communication connections as known to those skilled in the art. For example, network 108 may be the Internet, an intranet, or other wireless or hard-wired connection(s) through which the remote devices 104a-104n may communicate with the data storage systems 102, other remote devices, and other components (not shown) that may be included in the system 100. Communication medium 110 may be a network connection, bus, and/or other type of data link, such as a hardwire or other connections known in the art. In one embodiment, the communication medium 110 may be a local area network (LAN) connection and network 108 may be the internet.

Each of the remote devices 104a-104n and the data storage systems 102 included in the system 100 may be connected to network 108 by any one of a variety of connections as may be provided and supported in accordance with the type of network 108. Similarly, the management system 106 may be connected to the communication medium 110 by any one of a variety of connections in accordance with the type of communication medium 110. The processors included in the data storage system 102 and management system 106 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 102 and the remote device 104a-104n are described herein in more detail, and may vary with each particular embodiment. The management system 106 and the data storage systems 102 may all be located at the same physical site, or, alternatively, may also be located in different physical locations. In connection with communication medium 110, a variety of different communication protocols may be used such as Small Computer System Interface (SCSI), Fibre Channel (FC), and Internet SCSI (iSCSI). Some or all of the connections by which the management system 106 and data storage system 102 may be connected to their respective communication medium may pass through other communication devices, such as a Connectrix or other switching equipment that may exist such as a phone line, a repeater, a multiplexer or even a satellite. The particular type and number of connections may vary in accordance with particulars of each embodiment.

Devices 104a-104n may consist of any type of devices that are capable of storing data such as, for example, desktop workstations, laptops, cell phones, tablets, and PDAs. Devices 104a-104n may include one or more modules or components such as component 302 as shown in device 104a, as described below. A device, such as device 104a, or multiple devices, can comprise a web-based service that can be used to store and share files with other devices. Each of the devices 104a-104n as well as data storage system 102 can potentially create, access, and modify data objects. Data objects may include, for example, executable code, file documents, email, web history/bookmarks, calendar items, and music playlists.

The management system 106 may be used in connection with management of the data storage systems 102. The management system 106 may include hardware and/or software components. The management system 106 may include one or more computer processors connected to one or more I/O devices such as, for example, a display or other output device, and an input device such as, for example, a keyboard and mouse. A data storage system manager may, for example, view information about a current storage volume configuration on a display device of the management system 106.

An embodiment of the data storage systems 102 may include one or more data storage systems. One or more of the data storage systems included in data storage systems 102 may include one or more modules or components such as component 201, as described below. Each of the data storage systems may include one or more data storage devices, such as disks. One or more data storage systems may be manufactured by one or more different vendors. Each of the data storage systems included in data storage systems 102 may be inter-connected (not shown). Additionally, the data storage systems may also be connected to the network 108 through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 102.

It should be noted that each of the data storage systems may operate stand-alone, or may also be included as part of a storage area network (SAN) that includes, for example, other components such as other data storage systems.

Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Remote devices 104a-104n can provide data through the network 108 to the storage systems 102, and the storage systems may also provide data to the devices also through the network 108.

Figure 2:
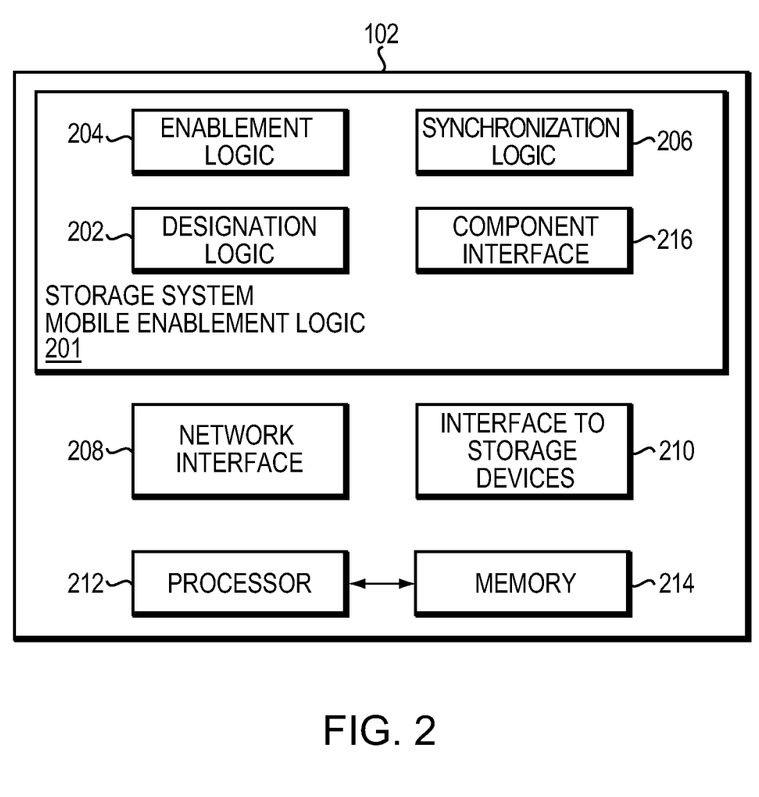
FIG. 2 illustrates a component diagram of an example data storage system that may be used with an embodiment of the technique herein.

Referring to FIG. 2, shown is a component diagram of a storage system 102 consistent with an example embodiment of the current technique. System 102 as shown includes storage system mobile enablement logic 201 that may include software and/or hardware components such as designation logic 202, enablement logic 204, and synchronization logic 206. The components 202, 204 and 206 may communicate with storage devices via an interface to storage devices 210. A network interface 208 may be provided to enable communication between the components 202, 204 and 206 and other devices such as remote devices 104a-104n. Each component 202, 204 and 206 may also communicate with one or more of the other components included in storage system 102. Particular embodiments may also provide a component interface 216 that allows an administrator to communicate with and manage the components 202, 204 and 206. For example, the interface 216 may give an administrator the ability to calibrate aspects of the components 202, 204 and 206.

The storage system 102 in this embodiment further comprises a processor 212 coupled to a memory 214. The processor 212 may comprise a microprocessor, a microcontroller, an application-specific integrated circuit (ASIC), a field programmable gate array (FPGA) or other type of processing circuitry, as well as portions or combinations of such circuitry elements. The designation logic 202, enablement logic 204, and synchronization logic 206 of the storage system 102 may be implemented in whole or in part in the form of one or more software programs stored in memory 214 and executed by processor 212.

The memory 214 may be viewed as an example of what is more generally referred to herein as a "computer program product" having executable computer program code embodied therein. Such memories may comprise electronic memories such as random access memory (RAM), read-only memory (ROM) or other types of memory, in any combination. The computer program code when executed in a processing device implementing the current technique causes the device to perform corresponding operations associated with functions such as distributing and synchronizing data objects across one or more remote devices 104a-104n. The computer program code may be used to implement other functionalities associated with the components 202, 204 and 206. One skilled in the art would be readily able to implement such software given the teachings provided herein. Other examples of computer program products embodying aspects of the invention may include, for example, optical or magnetic disks.

It should be noted that the data storage system 102, including storage system mobile enablement logic 201, may comprise other components in addition to those specifically shown in FIG. 2. For example, conventional components of a type known to those skilled in the art may be incorporated into the data storage system 102 or logic 201. As another example, a policy engine component may be incorporated in logic 201 to manage various policies such as, for example, data access policies. It should also be noted that in some embodiments functionalities and data provided by the components shown in FIG. 2 may be provided by other components shown or not shown in FIG. 2. For instance, a single component may provide all of the functionalities provided by one or more of components 202, 204 and 206.

Although the components 202, 204 and 206 in the present embodiment are illustratively shown as being implemented within the data storage system 102, in other embodiments the components 202, 204 and 206 may instead be implemented in another system or distributed across multiple systems. For example, one or more of the components 202, 204 and 206 may be implemented in the data storage management system 106.

Figure 3:
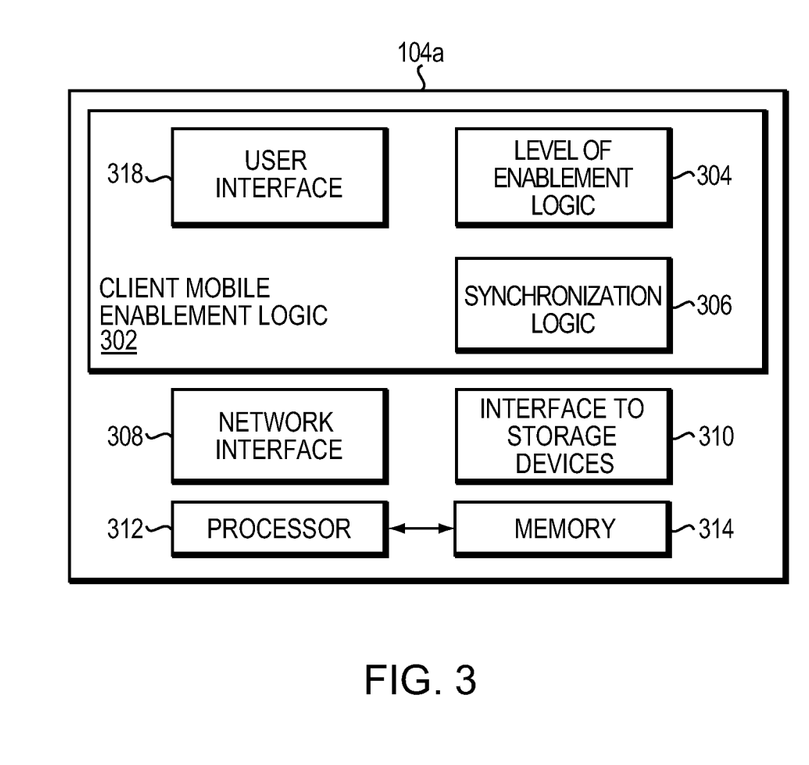
FIG. 3 illustrates a component diagram of an example device that may be used with an embodiment of the technique herein.

Referring to FIG. 3, shown is a component diagram of remote device 104a consistent with an example embodiment of the current technique. Device 104a as shown includes client mobile enablement logic 302 that may include software and/or hardware components such as level of enablement logic 304 and synchronization logic 306. The components 304 and 306 may communicate with storage devices of device 104a via an interface to storage devices 310. A network interface 308 may be provided to enable communication between the components 304 and 306 and the data storage system 102 as well as other devices such as remote devices 104b-104n. Each component 304 and 306 may also communicate with one or more of the other components. Particular embodiments may also provide a user interface 318 that may communicate with components 304 and 306.

The remote device 104a in this embodiment further comprises a processor 312 coupled to a memory 314. The processor 312 may comprise a microprocessor, a microcontroller, an ASIC, a FPGA or other type of processing circuitry, as well as portions or combinations of such circuitry elements. The level of enablement logic 304 and synchronization logic 306 of the device 104a may be implemented in whole or in part in the form of one or more software programs stored in memory 314 and executed by processor 312.

The memory 314 may be viewed as an example of a computer program product having executable computer program code embodied therein that when executed in a processing device implementing the current technique causes the device to perform corresponding operations, as described above with reference to FIG. 2. Other examples of computer program products embodying aspects of the invention may include, for example, optical or magnetic disks.

Remote device 104a may comprise other modules or components in addition to those specifically shown in FIG. 3. It should be noted that in some embodiments functionalities and data provided by the modules and components shown in FIG. 3 may be provided by other modules shown or not shown in FIG. 3.

Although the components 304 and 306 in the present embodiment are illustratively shown as being implemented within the device 104a, in other embodiments the components 304 and 306 can instead be implemented in another device or system or distributed across multiple devices or systems.

It is important to note that consistent with an example embodiment of the current technique, the components shown in the data storage system component diagram of FIG. 2, including the components within the storage system mobile enablement logic 201, may also or alternatively reside in one or more of the remote devices 104a-104n. For example, remote device 104a as shown in FIG. 3 may contain one or more of the components illustrated in FIG. 2 to provide the same or similar functionalities as storage system 102 as described herein.

In an embodiment of the current technique, the systems, devices, and components described above with reference to FIG. 1, FIG. 2, and FIG. 3 may be used to help "mobile-enable" data objects. Depending on the embodiment, data objects that are mobile enabled can be accessed, modified, and/or synchronized across one or more remote devices 104a-104n (e.g., cell phones). Mobile enabling data objects may include designating eligible data objects as accessible by remote devices 104a-104n and enabling designated data objects for access by one or more of remote devices 104a-104n. For instance, mobile-enabled data objects may be distributed to one or more of a user's (or multiple users) remote devices. Alternatively, or in addition, the mobile-enabled data objects may be distributed to one or more devices 104a-104n that comprise a web-based file hosting service where the data objects can be accessed by other devices. In many embodiments, mobile-enabled data objects may remain synchronized across all devices to ensure, for example, data integrity.

Figure 4:
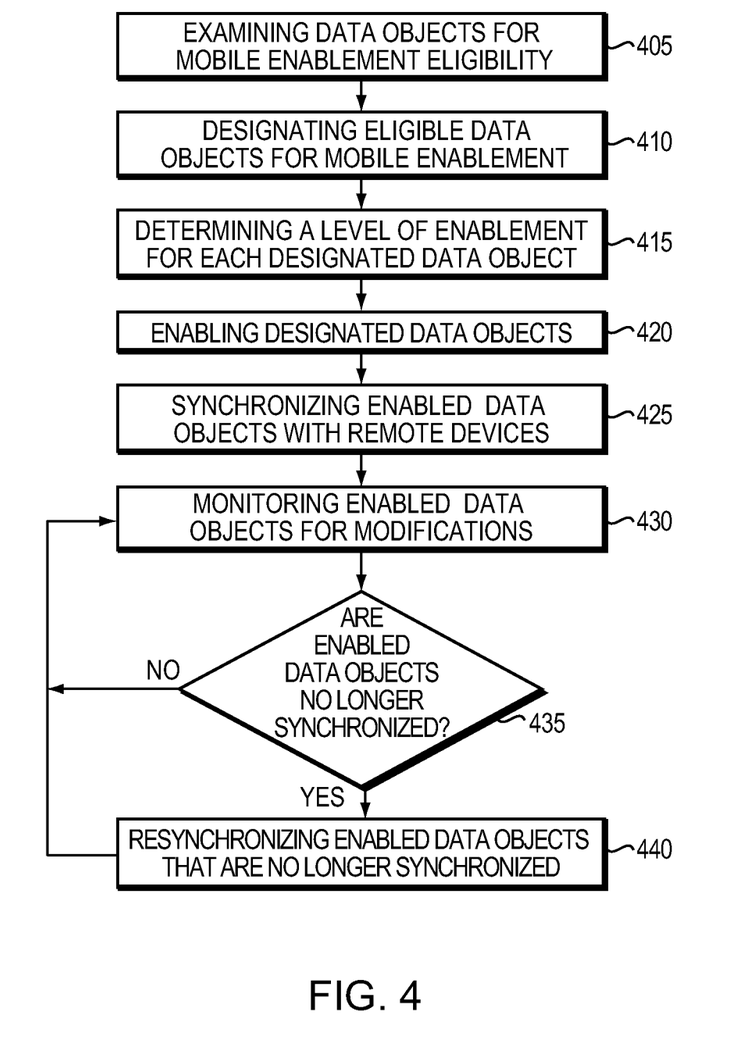
FIGS. 4 and 6 illustrate flowcharts that may be used with an embodiment of the technique herein.

Referring to FIG. 4, shown is a flow diagram illustrating mobile enablement steps that may be used with an embodiment of the current technique that includes a data storage system and one or more remote devices, as described above.

In step 405, data objects may be examined to determine whether the objects are eligible for mobile enablement. For example, designation logic 202 may automatically and periodically scan data objects (e.g., files or directories in a file system) to determine whether the data objects are eligible for mobile enablement. In this example, the determination may depend on system-, application-, and/or user-based criteria or policies, possibly with the assistance of a policy engine. A user of storage system 102, which may be a system administrator, may use component interface 216 to specify to designation logic 202 criteria that may be used to determine whether data objects are eligible. Criteria or policies may include, without limitation, one or more of the following: data object type, location of the data object, data object ownership, security and privacy characteristics of the data object, data object size, access periodicity of the data object, and creation or modification date of the data object. Once the criteria are determined, designation logic 202 may scan all or some of the data objects located in storage system 102 to determine whether each data object is eligible for mobile enablement. For example, designation logic 202 may scan a selected set of physical or logical storage devices or a selected file system or file directory. In some cases, scanning may take place at a scheduled time or upon a triggering event (e.g., a mouse click).

In some embodiments, the eligibility determination may also consider system- or application-based policies. For example, designation logic 202 may determine and apply applicable policies based on which application a data object is associated with and for what purpose the application uses the data object. Alternatively, applications may communicate, for example, possible restrictions or policies to designation logic 202. With this knowledge, the designation logic 202 may determine, for example, that the data object should not be mobile enabled or access to the data object should be limited because application or system performance degradation may otherwise occur.

In some embodiments, designation logic 202 may also monitor data storage system 102 to detect the addition of new data objects or, alternatively, it can be notified when new data objects are added or created. In these embodiments, the addition of new data objects may trigger an examination of the new data objects to determine whether it is eligible for mobile enablement.

In step 410, a data object that is determined to be eligible for mobile enablement may be designated for mobile enablement. The eligible data object may be designated by designation logic 202 by, for example, using a flag, modifying metadata of the data object, using a log that contains information about the data object, or migrating the data object to a specific location. In some embodiments, designation may apply to all or a portion of the eligible data objects automatically. For instance, a data object may be designated when it is determined to be eligible for mobile enablement. In other embodiments, an eligible data object may be designated when a user or administrator selects the data object for designation using component interface 216.

In step 415, a level of enablement may be determined for a data object designated for mobile-enablement, for example, by a user or based on policies using enablement logic 204. In some embodiments, the level of enablement associated with a data object may change over time. A level of enablement may establish, for example, user and/or remote device mappings based on a user selection or policy so that only particular users, devices, or combinations of users and devices are able to access and/or modify the designated data object. Thus, as an example, user or policy may dictate that a particular designated data object can only be modified by its creator on authorized remote devices belonging to the user and that the data may be accessed but not modified by other users on remote devices belonging to them. In some embodiments, establishing the mappings may require information about remote device 104a-104n to be entered into the system 102 via component interface 216. An embodiment may also or alternatively require an exchange of information, or a "hand shake," between system 102 and the remote devices 104a-104n to establish the mappings.

A user or policies may also define the level of enablement by, for example, requiring varying levels of encryption for data object transmission, requiring user authorization (e.g., username and password) and/or device authorization, setting data object privileges (e.g., a file may be read only), designating how long the data object will be enabled, and designating dates and/or times during which the data object can be accessed as well as from which location the data object can be accessed (e.g., physical location or network location). For example, a data object that is mapped to a specific user and a number of that user's remote devices may contain confidential software code and be critical to an application operation. Thus, a low level of enablement may be defined for the data object by, for example, requiring strong encryption and providing read-only access.

In some cases, information pertaining to the level of enablement of a data object may be stored in a single file accessible to enablement logic 204 when enabling the data object. In other cases, the information may be dispersed across multiple files accessible to enablement logic 204 when enabling the data object, each file being associated with a single data object or a grouping of objects.

In step 420, the designated data object may be mobile enabled, possibly, based on its respective level of enablement. In some embodiments, mobile enabling designated data comprises enablement logic 204 causing a mobile data storage "tier" to include the data object. Once the data object is included as part of the mobile tier, the data object may be distributed and synchronized across one or more devices 104a-104n via network 108 as explained in step 425 below.

In one example embodiment, causing the data object to be included as part of a mobile tier may be achieved by manipulating or adding metadata associated with designated data objects such that all mobile-enabled data objects are distinguishable from data objects that are not mobile enabled. Similarly, a reference file may be created that identifies only mobile-enabled data objects.

In another example embodiment, one or more mobile tiers may be created by establishing mobile file directors. To mobile enable designated data objects in this embodiment, the objects need only be placed in an appropriate directory. In this example, multiple directories and subdirectories may exist. For instance, a mobile tier directory may be associated with a user, and subdirectories, each associated with a device of the user, may exist within that directory.

Also, directories and/or subdirectories may exist for different levels of enablement. For instance, a directory containing mobile-enabled data objects that are accessible by one or more users may have a certain encryption strength and privileges associated with it. It should be noted that additional directories and subdirectories may also be pursued to further segregate data objects based on various criteria.

Figure 5:
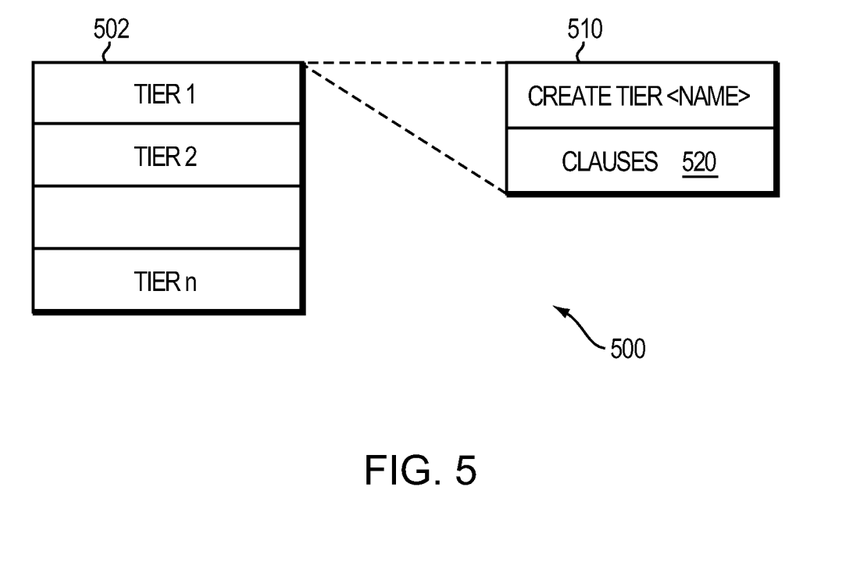
FIG. 5 illustrates example storage tiers that may be used with an embodiment of the technique herein.

In yet another example embodiment, a physical storage device, or physical storage devices that are physically and/or logically grouped together, may comprise one or more mobile tiers that may be thought of as physical mobile tiers. Referring to FIG. 5, shown is an example illustrating tiers comprised of grouped devices. The example 500 includes a set of one or more physical mobile tiers 502. Each tier, such as tier 1, may be creating by specifying a tier definition 510. In at least one embodiment, the tier definition 510 may include one or more lines of text in a language which may be subsequently processed by code on the data storage system 102. The tier definition 510 defines a tier indicated by <NAME>. The tier definition may include one or more clauses 520. The clauses of 520 may include one or more configuration clauses.

Each physical mobile tier 502 may be made up of physical devices with different physical and performance characteristics (e.g., types of physical devices, disk speed such as in RPMs), RAID levels and configurations, different replication services (such as particular software used in the data storage system providing data replication), allocation of cache, and processors used to service an I/O request. A more detailed description of tiers and migrating data between tiers is provided by U.S. patent application Ser. No. 12/494,622, entitled "Facilitating Data Migration Between Tiers," by Dean D. Throop et al., the contents of which are hereby incorporated by reference herein.

In some embodiments, only one physical mobile tier is designated as a mobile tier. In another embodiment, multiple physical mobile tiers may exist. In this embodiment, the performance characteristics may define each tier. In other words, the physical devices may be partitioned into tiers based on the performance characteristics of the devices; grouping similar performing devices together. An embodiment may also define a hierarchy of multiple tiers. A set of data storage resources, such as logical and/or physical devices, a portion of cache, and services, such as a software vendor's service for providing data replication, may be bound to, or designated for use by, consumers in a particular tier.

In at least one embodiment, the set of resources associated with or designated for use by a physical mobile tier may be characterized as a dynamic binding in that the particular set of data storage system resources utilized may vary from time to time. In this embodiment, the current configuration for a data storage system, the static aspects of the current data storage system resources (e.g., types of devices, device storage capacity and physical device characteristics related to speed and time to access data stored on the device), and current workload and other dynamic aspects of the data storage system (e.g., actual observed performance and utilization metrics), may vary at different points in time.

In an embodiment with multiple physical mobile tiers, each tier of devices may be reserved for data objects of a certain "temperature." In general, data objects that are "hot," due to frequent access, may be migrated to a tier comprised of better performing devices, such as, for example, flash devices. Data objects that are "cool," due to infrequent access, may be migrated to a tier comprised of lower performing devices, such as, for example, magnetic disks. Migrating the hottest, most accessed, data objects to the best or fastest performing devices can improve performance of remote access of mobile-enabled data objects while migrating the coldest data objects to lower performing devices, which are typically less expensive, gives improved total cost of ownership.

In an alternative embodiment, each physical mobile tier may be associated with, for example, a user. Thus, it should be noted that data objects may be segregated by tiers and possibly further segregate based on various criteria such as, for example, different levels of enablement.

In some embodiments, the placing of a data object on a mobile tier is invisible to users and/or applications associated with the data object. For example, although the physical address of a data object may change when placed on a mobile tier, the data object's logical address may remain unchanged.

In step 425, mobile-enabled data objects are synchronized with remote devices. In some embodiments, synchronization of a data object may be initiated by synchronization logic 206 and possibly in accordance with the level of enablement associated with the data object. In these embodiments, the level of enablement may specify, for example, which users and devices should have access to the data object, what privileges those users have, as well as other access restrictions. As a specific example, synchronizing a mobile-enabled data object with one or more remote devices may first require reading metadata that defines the object's level of enablement. The metadata may then be used to adjust, for instance, security settings of the data object so that the object is communicated to the remote device using strong encryption.

In an embodiment, providing remote devices 104a-104n access to the data object may be achieved by granting remote access to the data object through network 108. In an example embodiment including device 104a as shown in FIG. 3, a user may remotely access mobile-enabled data objects presented to a user of device 104a in user interface 318 via network interface 308. In this embodiment, the level of enablement associated with the object may require, for example, the user to enter a username and password or it may designate when the data objects are accessible by the user so that the data objects are only visible to a user that is using user interface 318 at predetermined times.

In another embodiment, providing remote devices 104a-104n access to the data object may be achieved by uploading a copy of the data object to a remote device or devices that comprises a web-based file hosting service that is accessible to or synchronized with other remote devices through network 108. In this embodiment, a user of a device such as device 104a may access the web-based service using user interface 318. In yet another embodiment, a copy of the data object can be uploaded directly to remote devices 104a-104n belonging to one or more users through network 108 so that, for example, each device has a copy of the data object. In these embodiments, the level of enablement associated with the object may be used to determine, for example, how and when (e.g., what version of the file and what level of encryption) the data is communicated to the service and/or other devices.

Other embodiments that give a user and/or the user's device access to mobile-enabled data may also be used in accordance with the current technique as described herein. For example, devices 104a-104n can be notified that a data object has been mobile enabled so that mapped devices may download (e.g., automatically) a copy of the data object.

In some or all of the embodiments above describing possible ways to synchronize data objects with remote devices 104a-104n, one or more of devices 104a-104n may be enabled to exchange mobile-enablement information between the data storage system synchronization logic 206 and the devices 104a-104n. For example, in an embodiment where mobile-enabled data objects are directly uploaded to device 104a, device 104a, as shown in FIG. 3, may communicate with data storage system synchronization logic 206 using, for example, synchronization logic 306 and network interface 308. For example, component 306 may be responsible for receiving mobile-enabled data objects and/or associated level of enablement information. As another example, component 306 may communicate credentials to the data storage system 102 using network interface 308 to help system 102 or device 104a determine whether access to mobile-enabled data should be granted. As yet another example, depending on the embodiment, a user interface 318 may be provided to a user that gives the user access to mobile-enabled data objects located on or received from the data storage system 102 or located on or received from another device 104b-104n.

Synchronization may also include enablement logic 304 in device 104a helping enforce level of enablement requirements associated with a mobile-enabled data object communicated to the device 104a. For example, logic 304 may be responsible for limiting a user's actions on mobile-enabled data objects based on level of enablement information (e.g., security settings) received from the data storage system synchronization logic 206. As an example, in some embodiments, logic 304 may be responsible for removing mobile-enabled data objects uploaded to device 104a from device 104a based on received level of enablement information that prescribes a predetermined time period after which the data objects must be removed from device 104a. As another example, based on received level of enablement information, logic 304 may require varying levels of user authentication (e.g., username and password verification) before a user can access a mobile-enabled data object.

In step 430, mobile-enabled data objects are monitored for modifications. Generally, data objects are manipulated by data storage system 102, users and/or administrators, or applications associated with the data objects. This step monitors the data objects on the data storage system 102 over time and determines whether a data modification has occurred.

In step 435, a determination may be made as to whether mobile-enabled data objects are no longer synchronized. For example, this determination may be based on a log that includes information such as which devices have a copy of a mobile-enabled data object as well as information that signals the contemporaneity of the copied data object (e.g., using a date that the data is copied or a version number). If the data object is still synchronized, the process moves to step 440, and otherwise returns to step 430.

In step 440, unsynchronized mobile-enabled data objects are resynchronized. For example, a data object may be uploaded to device 104a as described above to replace an outdated copy of the data object located on device 104a. In some embodiments, synchronization logic 306 found on device 104a may overwrite the outdated data object with the received up-to-date data object via a storage device interface 310. As another example, the user of device 104a may be notified that a data object has been modified via user interface 318. In this example, the user may be given the option to have the outdated data object updated, for example, by having the file uploaded to device 104a.

Figure 6:
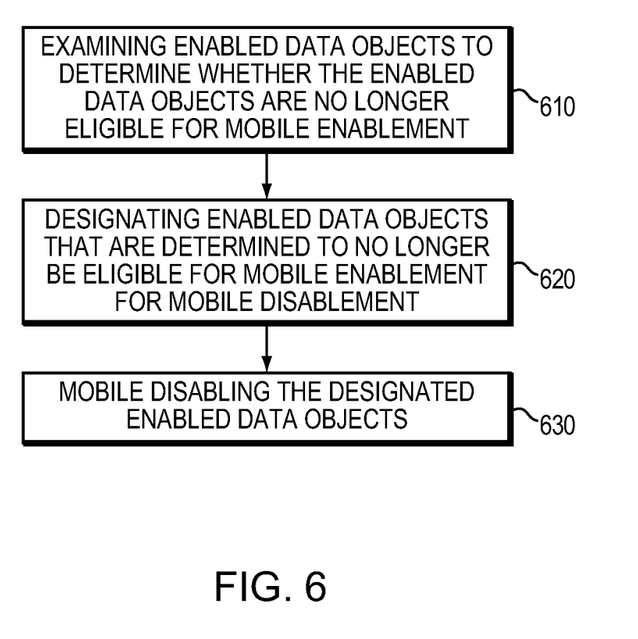

In some embodiments, it may be determined that a mobile-enabled data object is no longer eligible for mobile enablement, in which case the mobile-enabled data object shall be mobile disabled such that the data object is no longer mobile accessible. Referring now to FIG. 6, shown is a flow diagram illustrating mobile disablement steps that may be used with an embodiment of the current technique that includes a data storage system and one or more remote devices, as described above.

In step 610, data objects may be examined to determine whether the objects are no longer eligible for mobile enablement. For example, designation logic 202 may automatically and periodically examine data objects (e.g., by scanning) to determine whether the data objects are no longer eligible for mobile enablement based on the same or similar policies used to determine whether data objects are eligible for mobile enablement. In some cases, scanning may take place at a scheduled time or upon a triggering event (e.g., a mouse click). In at least one embodiment, a data object may be determined to no longer be eligible for mobile enablement due to system, application, or data object modifications. For instance, the mobile enablement of a data object may be causing performance degradation for an associated application following modifications of the application's settings. In another embodiment, policy changes may result in data objects no longer being eligible for mobile enablement. In yet another embodiment, the time period during which an object is eligible for mobile enablement (e.g., working hours or a number of days or years) may have elapsed.

In step 620, enabled data objects that are determined to no longer be eligible for mobile enablement may be designated for mobile disablement. In some embodiments, a data object may be designated for disablement by designation logic 202 by, for example, using a flag, modifying or adding to metadata of the data object, using a log that contains information about the data object, or migrated the data object to a specific location. In some embodiments, designation may apply to all or a portion of the data objects automatically. For instance, a data object may be automatically designated when it is determined to no longer be eligible for mobile enablement. In other embodiments, the data object may be designated when a user or administrator selects the data objects for designation using component interface 216.

In step 630, the designated data objects may be mobile disabled. In some embodiments, mobile disabling a designated data object requires the enablement logic 204 removing the data object from a mobile data storage tier. In these embodiments, removing a data object from a mobile tier may include, for example, modifying metadata of or adding metadata to the data object or migrating the data object from a directory location or a physical storage location to a different location. It should also be noted that removing a data object from a tier may be invisible to a user and/or application associated with the data object.

In an embodiment, mobile disabling data objects may also require that the data objects be removed from synchronized remote devices 104a-104n. For example, synchronization logic 206 on the data storage system 102 may instruct device 104a to remove the corresponding copy of the disabled data object. Synchronization logic 306 of device 104a may then remove the data object via the interface to the storage devices 310.

It should be noted that, in an embodiment, synchronization logic 306 of device 104a may also monitor mobile enabled data object copies that have been uploaded to device 104a for modifications. In some embodiments, if a data object copy is modified on device 104a (e.g., by a user action), it may be desired to update the original data object located on the data storage system 102 and the corresponding copies of the data object distributed across one or more of the devices 104b-104n to reflect the modifications. In at least one embodiment, this resynchronization may be achieved by synchronization logic 306 of device 104a uploading the modified copy of the data object directly to the data storage system 102 and all other devices 104b-104n that have a corresponding copy of the data objet. In another embodiment, resynchronization may be achieved by synchronization logic 306 uploading the modified copy of the data object directly to the data storage system 102 or one or more of the other devices 104b-104n, such as a web-based file hosting service, which is then responsible for uploading the file to one or more other synchronized devices. In an alternative embodiment, notifications may be used to alert a data storage system and/or devices that an updated version of the data object can be downloaded.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing data objects, the method comprising:
examining a set of data storage objects stored on a first device to determine whether at least one of the data storage objects is eligible for mobile enablement, wherein the determination is based on one or more policies selected from a set of policies;
based on a positive determination, designating at least one examined data object stored on the first device is eligible for mobile enablement;
determining a level of mobile enablement for the data object, wherein the level is selected from a plurality of different levels;
based on a second policy selected from a set of policies, mobile enabling the data object, wherein mobile enabling the data object comprises causing a mobile data storage tier associated with the first device to include the data object, wherein the mobile data storage tier includes one or more tiers associated with one or more data storage system storage tiers to form a group of associated tiers, the tiers having different levels of performance; and
providing access to the data object to a second device and synchronizing the data object with the second device, wherein access is defined by the level of mobile enablement, wherein the second device is a mobile device.

2. The method of claim 1 wherein determining that the data object stored on a first device is eligible for mobile enablement is based on a first policy of the at least one policy set and determining the level of mobile enablement for the data object is based on a second policy of the at least one policy set.

3. The method of claim 1 wherein causing the mobile data storage tier associated with the first device to include the data object is achieved by manipulating metadata associated with the data object.

4. The method of claim 1 wherein causing the mobile data storage tier associated with the first device to include the data object is achieved by migrating the data object to a directory.

5. The method of claim 1 wherein causing the mobile data storage tier associated with the first device to include the data object is achieved by migrating the data object to a physical mobile tier.

6. The method of claim 1 wherein providing access to the data object to the second device is achieved by enabling remote access to the data object.

7. The method of claim 1 wherein providing access to the data object to the second device is achieved by uploading the data object to the second device.

8. The method of claim 1 wherein providing access to the data object to the second device comprises synchronizing the data object with the second device.

9. The method of claim 8, further comprising:
resynchronizing the data object with the second device.

10. The method of claim 1, further comprising:
mobile disabling the data object when it is determined that the data object is no longer eligible for mobile enablement.

11. A system for use in managing data objects, the system comprising:
examining a set of data storage objects stored on a first device to determine whether at least one of the data storage objects is eligible for mobile enablement, wherein the determination is based on one or more policies selected from a set of policies;
based on a positive determination, designate at least on examined data object stored on the first device is eligible for mobile enablement and a level of mobile enablement for the data object;
determine a level of mobile enablement for the data object, wherein the level is selected from a plurality of different levels;
based on a second policy selected from a set of policies, second logic configured to mobile enable the data object, wherein mobile enabling the data object comprises causing a mobile data storage tier associated with the first device to include the data object, wherein the mobile data storage tier includes one or more tiers associated with one or more data storage system storage tiers to form a group of associated tiers, the tiers having different levels of performance; and
third logic configured to provide access to the data object to a second device and synchronizing the data object with the second device, wherein access is defined by the level of mobile enablement, wherein the second device is a mobile device.

12. The system of claim 11 wherein determining that the data object stored on a first device is eligible for mobile enablement is based on a first policy and determining the level of mobile enablement for the data object is based on a second policy.

13. The system of claim 11 wherein causing the mobile data storage tier associated with the first device to include the data object is achieved by manipulating metadata associated with the data object.

14. The system of claim 11 wherein causing the mobile data storage tier associated with the first device to include the data object is achieved by adding the data object to a directory.

15. The system of claim 11 wherein causing the mobile data storage tier associated with the first device to include the data object is achieved by adding the data object to a physical mobile tier.

16. The system of claim 11 wherein providing access to the data object to the second device is achieved by enabling remote access to the data object.

17. The system of claim 11 wherein providing access to the data object to the second device is achieved by uploading the data object to the second device.

18. The system of claim 11 wherein providing access to the data object to the second device comprises synchronizing the data object with at least the second device.

19. The system of claim 18, further comprising:
fourth logic configured to resynchronize the data object with the second device.

20. The system of claim 11, further comprising:
fourth logic configured to mobile disable the data object when it is determined that the data object is no longer eligible for mobile enablement.

* * * * *